United States Patent
Digman

(10) Patent No.: US 9,763,385 B2
(45) Date of Patent: Sep. 19, 2017

(54) AUTOMATIC CONTROL OF RELATIVE POSITIONING OF THE CUTTER BAR AND REEL

(75) Inventor: Michael Jacob Digman, Denver, PA (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/420,658

(22) PCT Filed: Aug. 8, 2012

(86) PCT No.: PCT/US2012/049899
§ 371 (c)(1),
(2), (4) Date: Feb. 9, 2015

(87) PCT Pub. No.: WO2014/025346
PCT Pub. Date: Feb. 13, 2014

(65) Prior Publication Data
US 2015/0216123 A1    Aug. 6, 2015

(51) Int. Cl.
*A01D 41/127*    (2006.01)
*A01D 41/14*    (2006.01)

(52) U.S. Cl.
CPC .................................. *A01D 41/141* (2013.01)

(58) Field of Classification Search
CPC .................................................... A01D 41/141
USPC ................................ 56/10.2 R, 10.2 A, 14.4
See application file for complete search history.

(56) References Cited

U.S. PATENT DOCUMENTS

| | | | |
|---|---|---|---|
| 3,208,208 A | 9/1965 | Schatz | |
| 4,124,970 A | 11/1978 | Bernhardt | |
| 4,204,383 A | 5/1980 | Milliken, Jr. | |
| 4,376,298 A | 3/1983 | Sokol et al. | |
| 4,409,778 A | 10/1983 | McNaught | |
| 4,800,711 A | 1/1989 | Hurlburt et al. | |
| 4,845,931 A | 7/1989 | Bruner et al. | |
| 5,359,836 A | 11/1994 | Zeuner et al. | |
| 5,752,372 A | 5/1998 | Buermann | |
| 5,937,621 A * | 8/1999 | Eggenhaus | A01D 41/127 56/10.2 E |
| 5,978,720 A * | 11/1999 | Hieronymus | A01D 41/127 340/438 |
| 6,681,551 B1 | 1/2004 | Sheidler et al. | |
| 6,871,483 B1 * | 3/2005 | Panoushek | A01D 41/141 56/10.2 E |
| 7,006,802 B2 * | 2/2006 | Tsui | H04B 1/0346 340/12.28 |
| 8,150,699 B2 * | 4/2012 | Patch | 704/275 |

(Continued)

FOREIGN PATENT DOCUMENTS

| | | |
|---|---|---|
| JP | 02016916 A | 1/1990 |
| JP | H10155343 A | 6/1998 |

*Primary Examiner* — John G Weiss
(74) *Attorney, Agent, or Firm* — Peter K. Zacharias; Patrick M. Sheldrake

(57) ABSTRACT

A control system for a header of an agricultural harvesting machine providing the capability for positioning the reel and the cutter bar, respectively, with a single input, the control system configured and co-operable with the input for recognizing multiple predetermined discrete patterns of operator input, and responsive thereto, positioning a reel and cutter bar at predetermined relative positions, respectively.

15 Claims, 7 Drawing Sheets

(56) References Cited

U.S. PATENT DOCUMENTS 9,253,943 B2 * 2/2016 Buermann ........... A01D 41/141
2009/0107094 A1 4/2009 Bich et al.

* cited by examiner

AUTOMATIC CONTROL OF RELATIVE POSITIONING OF THE CUTTER BAR AND REEL

This application is the US National Stage filing of International Application PCT/US2012/049899 filed Aug. 8, 2012, which is incorporated herein by reference in its entirety.

This application is the US National Stage filing of International Application Serial No. PCT/EP2013/063228 filed on Jun. 25, 2013 which claims priority to Belgian Application BE2012/0454 filed Jul. 4, 2012, each of which is incorporated herein by reference in its entirety.

TECHNICAL FIELD

This invention relates generally to a control system for a header of an agricultural harvesting machine, and more particularly, to a system for moving the reel and the cutter bar to desired relative positions using a single input, the control system recognizing multiple predetermined discrete patterns of operator input, and responsive thereto, positioning a reel and cutter bar at predetermined relative positions, respectively.

BACKGROUND ART

On an agricultural header, a cutter bar typically extends across a lower front end of the header and includes a sidewardly reciprocating sickle or cutter bar for cutting crops. A pick up reel, rotatable about a sidewardly extending axis, is typically disposed above and forwardly of the cutter bar. The reel includes generally radially outwardly extending tines or fingers which essentially function to rake crops rearwardly to the cutter bar, and also to convey the cut crops rearwardly over the cutter bar to a pan or cross conveyor, such as an auger or draper belt, of the header. In regard to this latter function, it is typically desired for the cut crops to flow smoothly and evenly, without collecting on the cutter bar and/or clumping, onto the pan of the header and to the cross conveyor, and the tines are often desirably positioned to sweep over the cutter bar without contacting it, to prevent and remove clumps.

For certain crop conditions it is desirable to control the height the cutter bar by raising and lowering the header. For example, for legumes such as soybeans, a lower cutter bar is typically desired so as to cut close to the ground, because some of the bean bearing pods are located there, and it is desirable to harvest as much of the crop as is practical. For other crops, particularly grasses such as wheat, oats, and barley, the cutter bar is typically positioned higher, for instance, at a height typically several inches above the ground, because the grain bearing heads are at the top of the plant. And, if the straw is not to be baled, it is typically desirable to cut at an even higher height, to limit the amount of straw which is cut and inducted into the harvesting machine.

In addition, it is desirable to control the position of the reel relative to the cutter bar for certain crop conditions. For example, for taller stands of legumes and other crops to be cut closer to the ground, the reel will typically be positioned at a higher and more forward location relative to the cutter bar. For lower stands, the reel will typically be positioned at a lower and more aft location relative to the cutter bar. Also, for harvesting downed crops, a more forward and lower reel location may be most advantageous, and for taller crop stands, a higher and more rearward location may be preferred. And, in some instances, it may be desirable adjust the fore and aft position of the cutter bar and/or the reel during operation, as well as the vertical position of the reel, to optimize crop pick up.

Because a combine may be used for harvesting several varieties of crops, or a field to be harvested may contain both standing and downed crops, it would be desirable for an operator to have the capability to quickly and easily select a previously set reel and cutter bar relationship that is desirable for the various crop types and/or regions. It would also be desirable for the operator to have the capability to teach the system to position the reel and cutter bar in a desired relationship responsive to a quick and easy input. Additionally, it would be desirable to for the operator to have the capability to vary the previously set reel to cutter bar relationship and associate the varied relationship with either the original input or a newly defined operator input.

Accordingly, what is sought is a system for recognizing multiple predetermined discrete patterns of operator input, and responsive thereto, positioning a reel and cutter bar at predetermined relative positions, respectively, which provides one or more of the capabilities and overcomes at least one of the problems, shortcomings or disadvantages as set forth above.

SUMMARY OF THE INVENTION

What is disclosed is a control system for recognizing multiple predetermined discrete patterns of operator input, and responsive thereto, positioning a reel and cutter bar at predetermined relative positions, respectively, which provides one or more of the capabilities and overcomes at least one of the problems, shortcomings or disadvantages as set forth above.

A header of a harvesting machine includes a cutter bar and a reel for cutting and moving crops rearwardly into the harvesting machine for processing. First and second reel positioning devices are controllably operable for moving the reel in first and second directions, respectively, and a cutter bar positioning device is controllably operable for moving the cutter bar in the first direction. First and second reel sensing devices are configured and operable for sensing and outputting positions of the reel in the first and second directions, respectively, and a cutter bar sensing device is configured and operable for sensing and outputting a position of the cutter bar in the first direction. At least one controller is connected to an input operable for inputting commands thereto and the sensing devices for receiving position outputs. Further, the at least one controller is in operative control of the positioning devices.

According to a preferred embodiment of the invention, the input and the controller are configured and co-operable for recognizing multiple predetermined discrete patterns of operator input, and responsive thereto, automatically positioning the reel and the cutter bar to multiple predetermined relative positions, respectively.

According to a preferred aspect of the invention, a predetermined discrete pattern of operator inputs comprises at least two successive actuations of one input, and responsive thereto, the reel and the cutter bar are automatically positioned in predetermined positions, respectively.

Preferably, the first direction is generally horizontal and the second direction is generally vertical, and the reel moves in a range defined between forward and aft reel positions and upper and lower reel positions, respectively, and the cutter bar moves in a range defined between forward and aft cutter bar positions.

According to a preferred feature of the invention, responsive to two successive actuations of a reel up input, the reel is automatically positioned at the forward reel position and between the upper and lower reel positions at about two thirds of the range upward, and the cutter bar is automatically positioned at the forward cutter bar position. This relative positioning of the cutter bar and the reel is representative of relative positions commonly utilized for high yielding standing cereal grain.

According to another preferred feature of the invention, responsive to two successive actuations of a reel down input, the reel is automatically positioned between the forward and aft reel positions at about two thirds of the way aft and between the upper and lower reel positions at about one third of the range upward, and the cutter bar is automatically positioned at the aft cutter bar position. This relative positioning of the cutter bar and the reel is representative of relative positions commonly utilized for low yielding (short) standing cereal grain.

According to yet another preferred feature of the invention, responsive to three successive actuations of the reel up input, the reel is automatically positioned at the aft reel position and the lower reel position, and the cutter bar is automatically positioned at the aft cutter bar position. This relative positioning of the cutter bar and the reel is representative of relative positions commonly utilized for severely lodged crops.

According to another preferred aspect of the invention, the control system includes an operator defined mode configured and operable for recognizing an operator defined pattern of inputs, and responsive thereto, automatically positioning the reel and cutter bar at operator defined reel and cutter bar positions, respectively.

According to a preferred feature of the operator defined mode, the operator positions the reel and the cutter bar in desired positions, respectively, and defines an associated discrete pattern of operator inputs. Then the input and the controller are configured and co-operable for recognizing the defined discrete pattern of operator inputs, and responsive thereto, automatically positioning the reel and the cutter bar in the desired positions, respectively.

According to another preferred feature of the operator defined mode, the operator modifies the predetermined discrete pattern of operator inputs associated with the predetermined positions of the reel and the cutter bar, respectively, and associates the modified discrete pattern of operator inputs with the predetermined positions of the reel and the cutter bar, respectively. Then the input and the controller are configured and co-operable for recognizing the modified discrete pattern of operator inputs, and responsive thereto, automatically positioning the reel and the cutter bar in the predetermined positions, respectively.

According to yet another preferred feature of the operator defined mode, the operator modifies the predetermined positions of the reel and the cutter bar, respectively, and associates the predetermined discrete pattern of operator inputs with the modified positions. Then the input and the controller are configured and co-operable for recognizing the predetermined discrete pattern of operator inputs, and responsive thereto, automatically positioning the reel and the cutter bar in the modified positions, respectively.

Operator inputs for the control system may preferably include reel up input, reel down input, propulsion lever inputs, touch screen inputs, voice inputs, and the like. In addition, preferred hardware for positioning devices and sensing devices may be actuators and sensors, respectively, and are preferably conventionally constructed and operable.

An advantage provided by the control system of the present invention is ease and efficiency with which an operator can capture desired relative positions of the reel and the cutter bar. Rather than using sustained actuation and fine tuning of reel fore/aft, reel up/down, and cutter bar fore/aft inputs, the control system automatically positions the reel and the cutter bar precisely in the predetermined relative positions in response to the discrete patterns of operator input, e.g. two successive actuations of reel up, three successive actuations of reel down, etc.

DETAILED DESCRIPTION OF THE INVENTION

Figure 1:
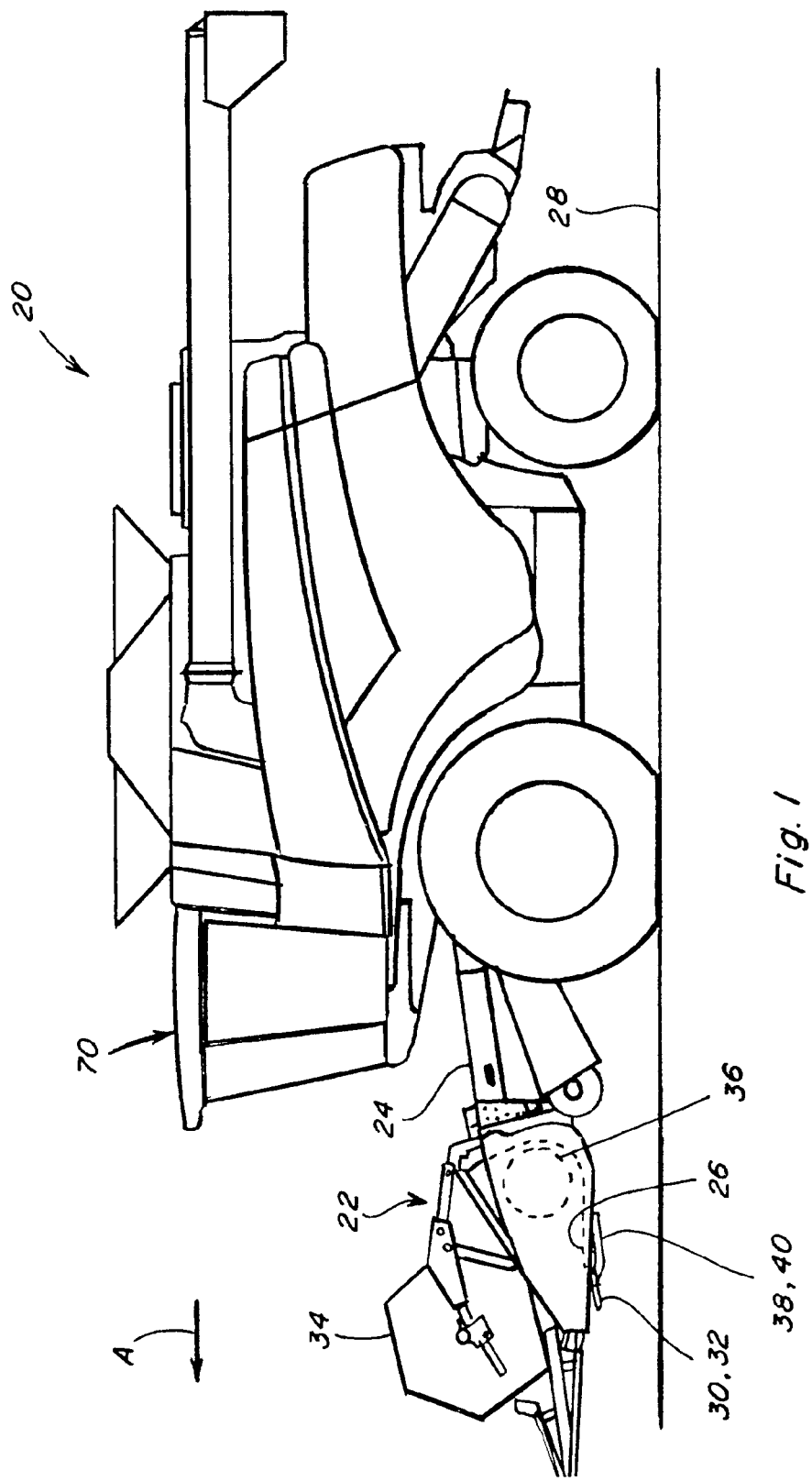
FIG. 1 is a perspective side view of a front half of a representative agricultural harvester moving through a field including a header suitable for use with the present invention.

Turning now to the drawings wherein a preferred embodiment of the invention is shown, in FIG. 1, a conventional, well known agricultural combine 20 is shown including a conventional header 22 supported on a feeder 24, for cutting or severing crops such as, but not limited to, legumes such as soybeans and small grains such as wheat, and inducting the severed crops into feeder 24 for conveyance into combine 20 for threshing and cleaning, in the well known manner as combine 20 moves forwardly over a field, as denoted by arrow A. Header 22 includes a bottom or pan 26 which is supported in desired proximity to a ground surface 28 of a field during the harvesting operation, and an elongate, sidewardly extending cutter bar 30 supporting elongate, reciprocally movable sickle knives 32 disposed along a forward edge of pan 26 which sever the crop for induction into header 22. Header 22 includes an elongate, sidewardly extending reel 34 disposed above pan 26 and rotatable in a direction for gathering the crops to be cut toward cutter bar 30, and then for facilitating induction of the severed crops into header 22. An elongate, rotatable auger 36 extends in close proximity to a top surface of pan 26 and has spiral flights therearound (not shown) which convey the severed crops to feeder 24 for induction into combine 20.

Figure 2:
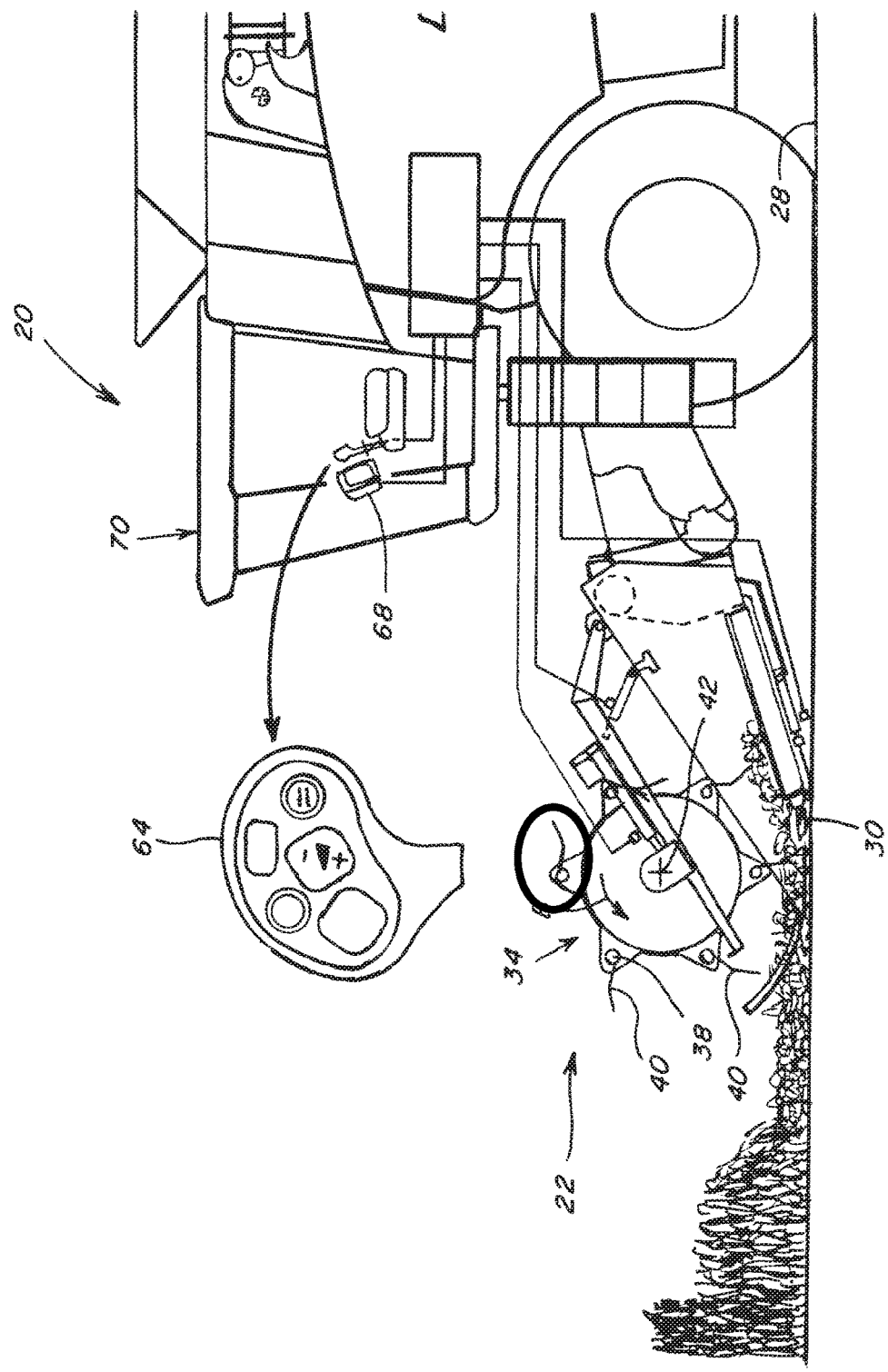
FIG. 2 includes an enlarged view of an input portion of a propulsion lever of the harvester as part of a side view of the front of the harvester showing a representative relationship between a cutter bar and a reel of the header during harvesting.

Referring also to FIG. 2, reel 34 is conventionally constructed and operable, and includes a plurality of elongate tines 40 supported at spaced locations on bars 38 extending across the width of header 22, so as to move in a raking action toward header 22, and particularly in the bottom region, toward cutter bar 30, as reel 34 is rotated in a counterclockwise direction, as denoted by arrow B, around a central axis 42 thereof.

In FIG. 1, header 22 is shown at an elevated position above ground surface 28, which is representative of a typical height for transport over roads, and also for severing crops at a desired height above ground surface 28, the height shown being intended to be representative of those typically used for harvesting grasses such as wheat, oats and barley, with minimal straw generation. Such heights as illustrated in FIG. 1 will typically be five inches or more above ground surface 28. In this configuration, cutter bar 30 is typically supported at a fixed height in relation to header 22, but is movable forwardly and rearwardly within a predetermined range of movement relative thereto. Reel 34 is movable upwardly, downwardly, forwardly, and rearwardly in relation to cutter bar 30 to position cutter bar 30 and reel 34 in relative locations for achieving desired crop cutting and induction characteristics.

In FIG. 2, cutter bar 30 is shown closer to ground surface 28, which is representative of a typical height utilized for cutting crops, such as soybeans and the like. Reel 34 can be positioned close to cutter bar 30, such that at the lower extent of travel around axis 40, tines 40 will pass close to and even just over cutter bar 30, which is advantageous to gather crops toward cutter bar 30 for cutting, and also to rake the cut crops over and rearwardly past cutter bar 30, so as not to collect thereon and possibly interfere with the cutting action. Again, cutter bar 30 may be moved forwardly and rearwardly and reel 34 may be moved upwardly, downwardly, forwardly, and rearwardly to position cutter bar 30 and reel 34 in relative locations for achieving desired crop cutting and induction characteristics.

Referring also to FIGS. 3, 4, 5, and 6, a fore and aft reel positioning device, represented by actuator 52, is controllably operable for moving reel 34 forwardly and rearwardly along a range between a forward reel position RF and an aft reel position RA, and a vertical reel positioning device, represented by actuator 54, is controllably operable for moving reel 34 upwardly and downwardly along a range between an upper reel position RU and a lower reel RD position. A cutter bar positioning device, represented by actuator 56, is controllably operable for moving cutter bar 30 forwardly and rearwardly along a range between a forward cutter bar position CF and an aft cuter bar position CA. Header 22 is configured with fore and aft and vertical reel position sensing devices, represented by sensors 46 and 48, respectively, and a cutter bar position sensing device, represented by sensor 50. Sensors 46 and 48 are configured and operable for sensing and outputting information representative of fore and aft and vertical positions of reel 34, respectively. Sensor 50 is configured and operable for sensing and outputting information representative of a position of cutter bar 30.

Each of the positioning devices represented by actuators 52, 54, and 56, and sensing devices 46, 48, and 50 is preferably conventionally constructed and operable. As an example in regard to the control of actuators 52, 54, and 56, a controller can control operation thereof in any suitable manner, for instance, via a system of solenoid valves controllable using variable electrical signals such as variable electrical currents, in the well known manner, for controlling pressurized fluid flow to and from the respective actuator.

It has been observed that for certain crop conditions, certain relative positional relationships between cutter bar 30 and reel 34 have been found to provide desirable harvesting characteristics, and operators frequently use the same or similar relative positioning of cutter bar 30 and reel 34 for these crop conditions. Currently, for these crop conditions, the operator manually sets the position of cutter bar 30 using cutter bar fore and aft inputs and the position of reel 34 using reel up, down, fore and aft inputs prior to harvesting, and if crop conditions change, the operator must stop and reset the positions of cutter bar 30 and/or reel 34 according to the changing crop conditions. In situations in which the crop conditions are generally uniform but include isolated areas of downed crops, for example, the operator may be required to stop harvesting to manually reposition cutter bar 30 and reel 34 several times, resulting in considerable time loss. For some of the commonly used relative positions of cutter bar 30 and reel 34, it would be desirable to have the capability to quickly and easily position and/or reposition cutter bar 30 and reel 34 at predetermined desired positions. These advantages are achieved by the header control system of the present invention discussed hereinbelow.

Figure 3:
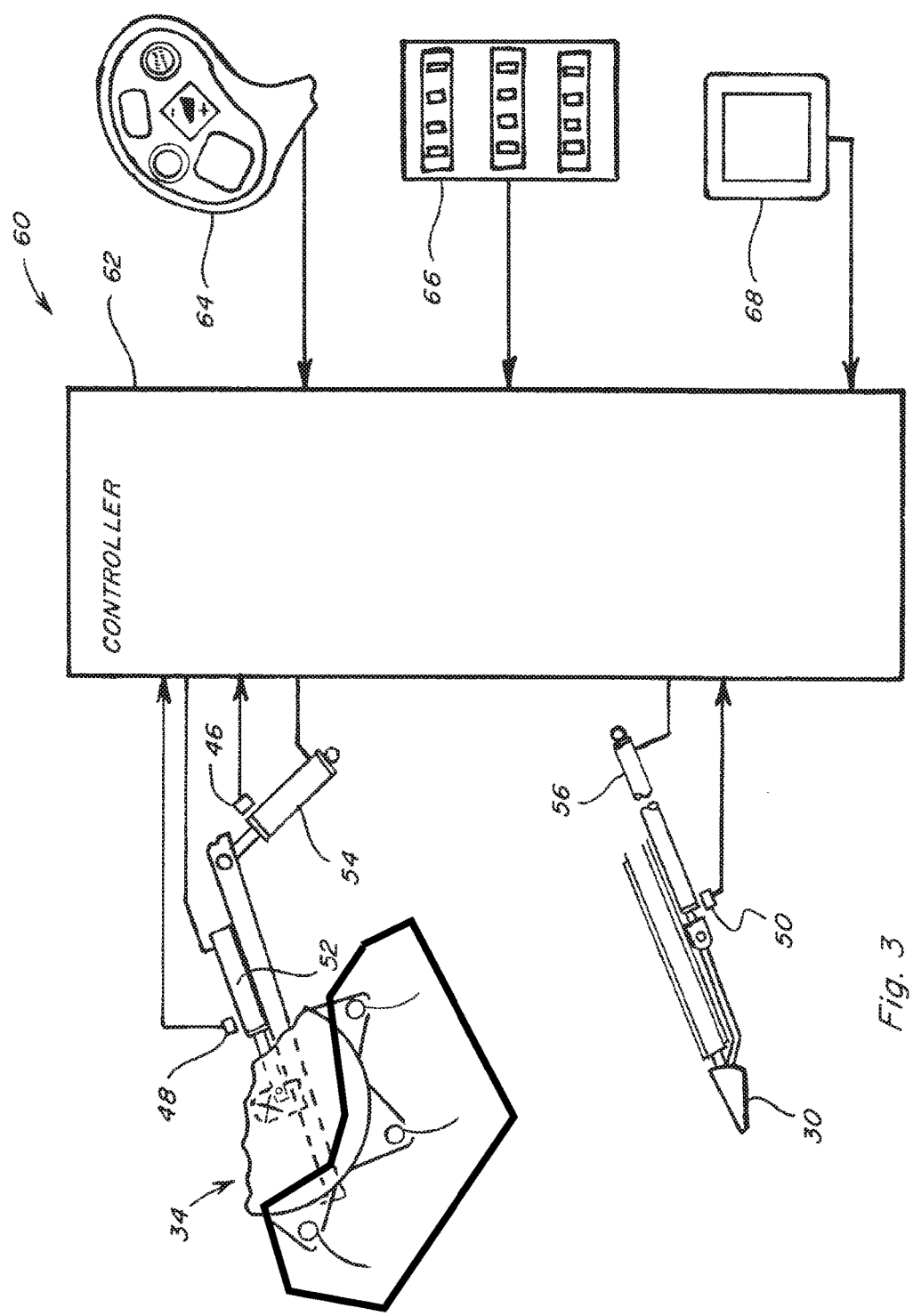
FIG. 3 illustrates an enlarged fragmentary side view of a portion of the header illustrating a first predetermined positional relationship between the cutter bar and the reel responsive to a first discrete operator input.

As seen in FIG. 3, one preferred embodiment of a control system 60 constructed and operable according to the present invention includes at least one controller, represented by processor based programmable controller 62, connected in operative control of the positioning devices or actuators 52, 54, and 56. Controller 62 is connected to an input, represented by a throttle lever 64, a console 66, or a touch screen 68, in a cab 70 for receiving operator input therefrom. The input and the controller are configured and co-operable for recognizing multiple predetermined discrete patterns of operator input, and in response thereto, automatically positioning reel 34 and cutter bar 30 to multiple predetermined relative positions, respectively.

An advantage provided by control system 60 is providing the operator the capability to move reel 34 (in both directions) and cutter bar 30 to predetermined positions with discrete patterns of one input. Rather than using sustained actuation and fine tuning of reel fore/aft, reel up/down, and cutter bar fore/aft inputs, control system 60 automatically positions reel 34 and cutter bar 30 precisely in predetermined relative positions in response to discrete patterns of operator input, e.g. two successive actuations of reel up, three successive actuations of reel down, etc.

According to a preferred aspect of the invention, the predetermined discrete pattern of operator inputs is at least two successive actuations of one input, preferably an input convenient to the operator, for example, inputs located on throttle lever 64. Then, responsive to the successive actuations of the one input, reel 34 and cutter bar 30 are automatically positioned in predetermined relative positions. This aspect is further illustrated in the features of the invention.

Figure 4:
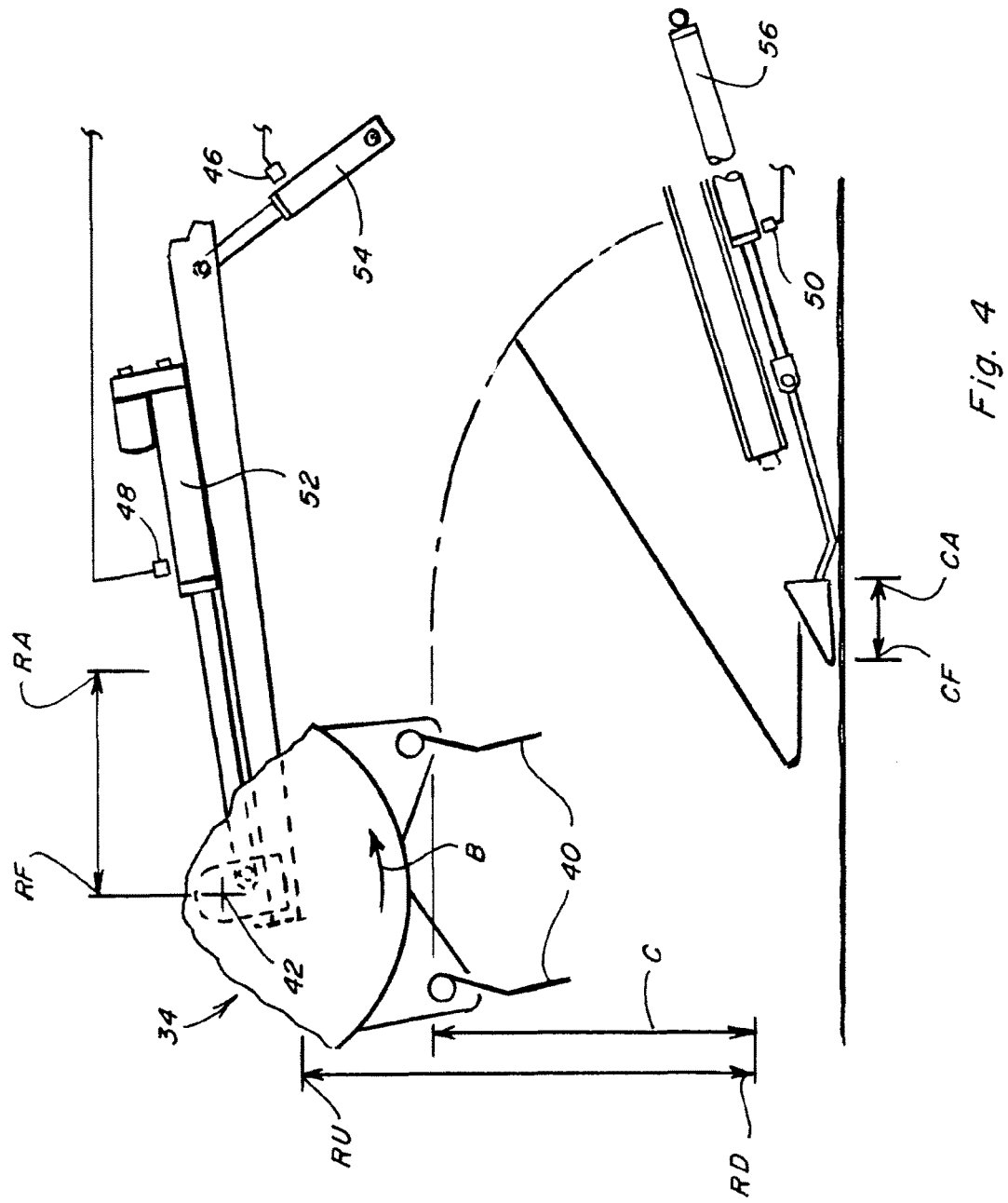
FIG. 4 is a simplified schematic illustration of the system of the present invention.

According to a preferred feature of the invention illustrated in FIG. 4, responsive to two successive actuations of a reel up input, reel 34 is automatically positioned at forward reel position RF and between upper and lower reel positions at about two thirds of the range upward, as represented by arrow C, and cutter bar 30 is automatically positioned at forward cutter bar position CF. This relative positioning of cutter bar 30 and reel 34 is representative of relative positions commonly utilized for high yielding standing cereal grain.

Figure 5:
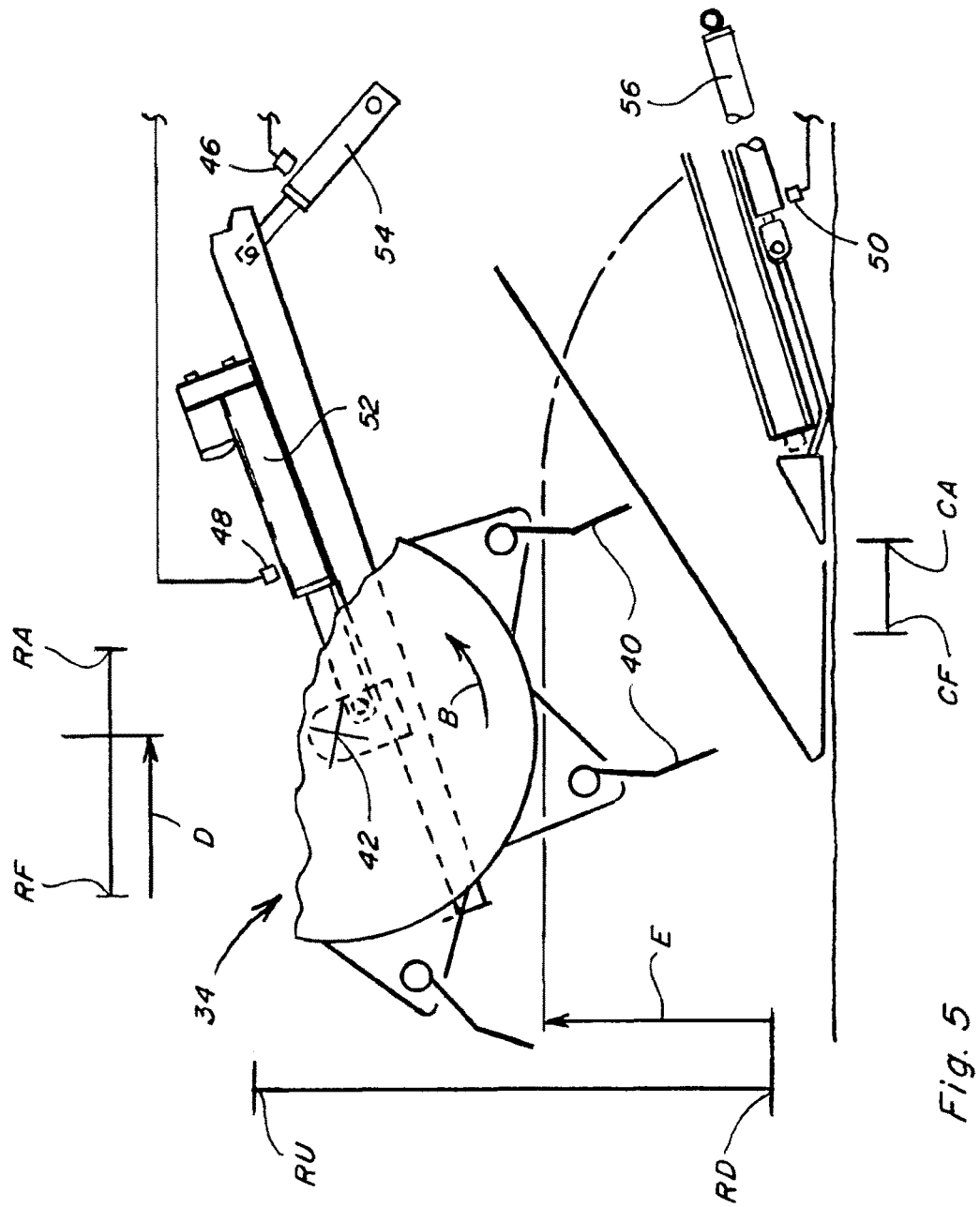
FIG. 5 illustrates an enlarged fragmentary side view of a portion of the header illustrating a second predetermined positional relationship between the cutter bar and the reel responsive to a second discrete operator input.

According to another preferred feature of the invention illustrated in FIG. 5, responsive to two successive actuations of a reel down input, reel 34 is automatically positioned between forward and aft reel positions at about two thirds of the way aft, as represented by arrow D, and between upper and lower reel positions at about one third of the range upward, as represented by arrow E, and cutter bar 30 is automatically positioned at aft cutter bar position CA. This relative positioning of cutter bar 30 and reel 34 is representative of relative positions commonly utilized for low yielding (short) standing cereal grain.

Figure 6:
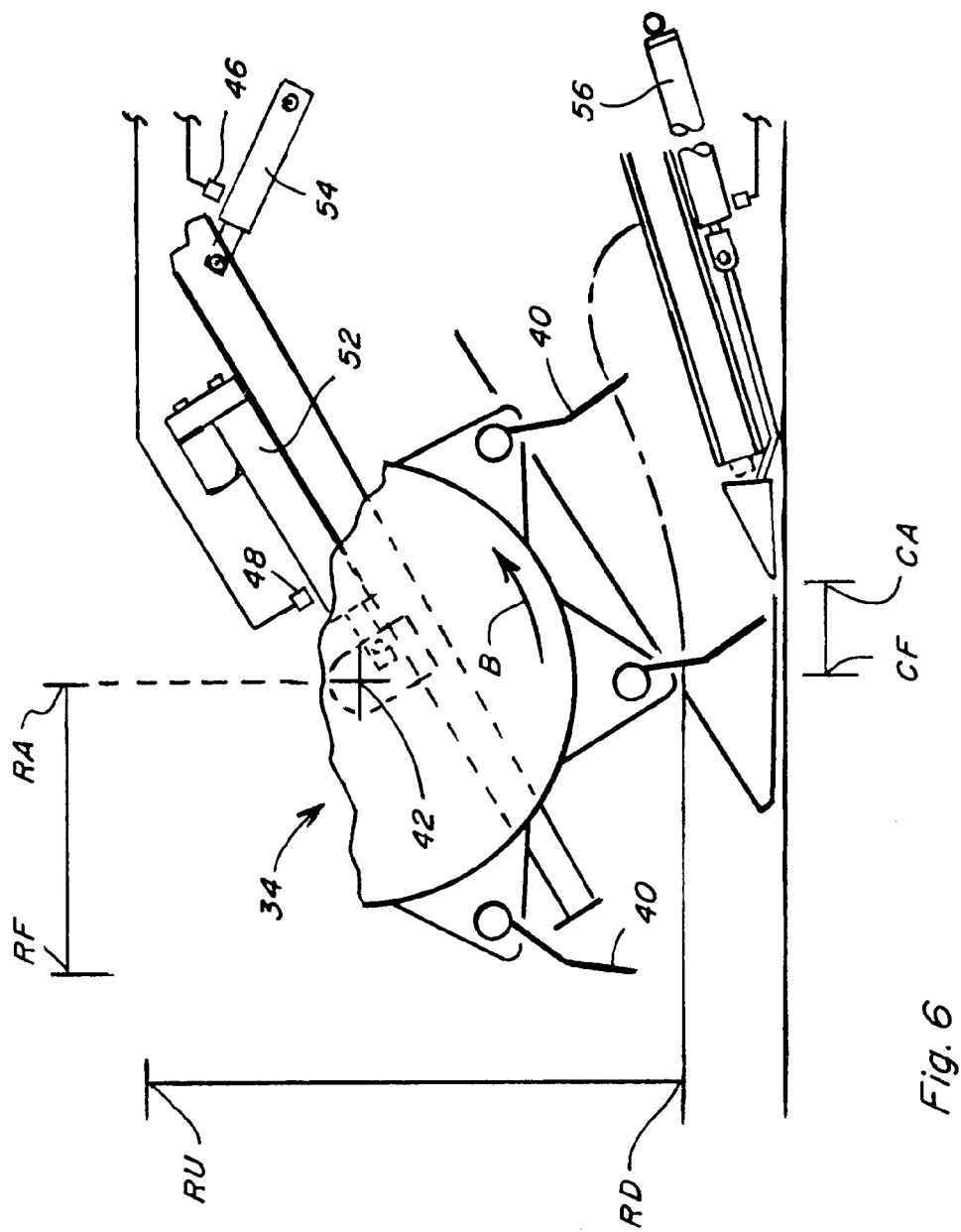
FIG. 6 illustrates an enlarged fragmentary side view of a portion of the header illustrating a third predetermined positional relationship between the cutter bar and the reel responsive to a third discrete operator input.

According to yet another preferred feature of the invention illustrated in FIG. 6, responsive to three successive actuations of the reel up input, reel 34 is automatically positioned at aft reel position RA and lower reel position RD, and cutter bar 30 is automatically positioned at aft cutter bar position CA. This relative positioning of cutter bar 30 and reel 34 is representative of relative positions commonly utilized for severely lodged crops.

Figure 7:
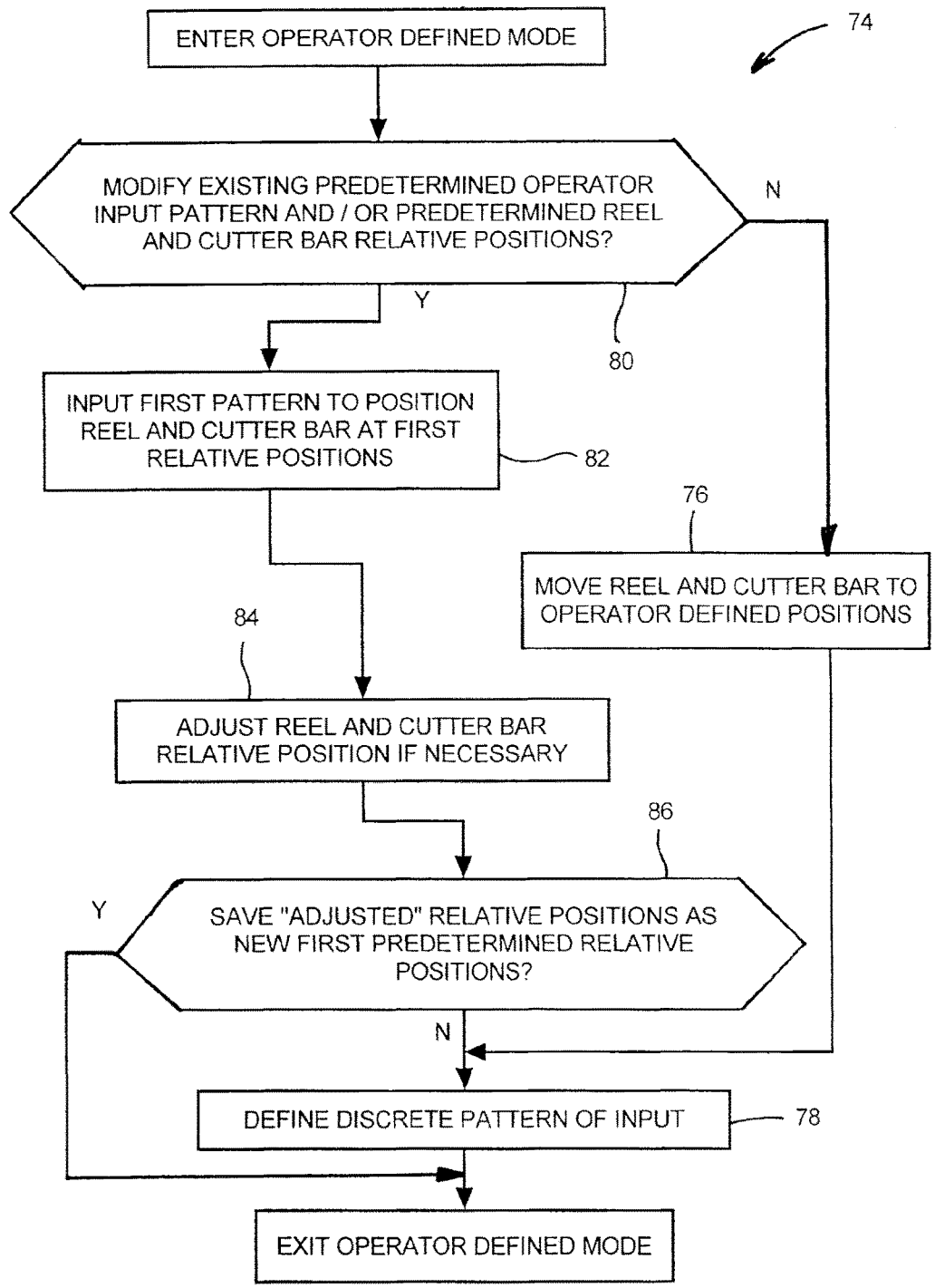
FIG. 7 is a simplified top level flow diagram for a preferred aspect of the invention.

According to another aspect of the invention, control system 60 includes an operator defined mode 74 as shown in FIG. 7. Operator defined mode 74 is configured and operable for recognizing an operator defined pattern of inputs, and responsive thereto, automatically positioning reel 34 and cutter bar 30 at operator defined reel and cutter bar positions, respectively.

According to a feature of operator defined mode 74, the operator can enter mode 74, move reel 34 and cutter bar 30 to desired positions, respectively, as seen at block 76, and define an associated discrete pattern of operator inputs as seen at block 78. After exiting operator defined mode 74, the input and the controller are configured and co-operable for recognizing the defined discrete pattern of operator inputs, and responsive thereto, automatically positioning reel 34 and cutter bar 30 in the desired positions, respectively.

According to another feature of operator defined mode 74, the operator can enter mode 74 and choose to modify either the predetermined operator input pattern or the predetermined positions of reel 34 and cutter bar 34, respectively, or both, as seen at decision block 80. To start from predetermined settings, the operator selects the discrete input pattern and reel 34 and cutter bar 30 relative positions combination to modify at block 82.

To modify only the predetermined discrete pattern of operator input associated with the predetermined relative position of reel 34 and cutter bar 34, the operator makes no adjustment to reel 34 and cutter bar 30 relative positions at block 84, and selects "NO" at decision block 86 to reach define discrete pattern of operator input at block 78. After exiting operator defined mode 74, the input and the controller are configured and co-operable for recognizing the modified or defined discrete pattern of operator input, and responsive thereto, automatically positioning reel 34 and cutter bar 30 in the predetermined positions, respectively.

To modify only the predetermined positions of reel 34 and cutter bar 30, respectively, associated with the predetermined pattern of operator input, the operator adjusts reel 34 and cutter bar 30 to modified positions, respectively at block 84, and at decision block 86, the operator selects "YES" to save the adjusted relative positions of reel 34 and cutter bar 30 as the new predetermined relative positions of reel 34 and cutter bar 30. After exiting operator defined mode 74, the input and the controller are configured and co-operable for recognizing the predetermined discrete pattern of operator input, and responsive thereto, automatically positioning the reel and the cutter bar in the modified positions, respectively. Of course, if the operator chose to define a discrete pattern of input at block 78, both the predetermined combination of inputs and reel 34 and cutter bar 30 relative positions would be available, as well as the modified combination of inputs and reel 34 and cutter bar 30 relative positions.

In light of all the foregoing, it should thus be apparent to those skilled in the art that there has been shown and described a header control system for automatic cutter bar and reel positioning. However, it should also be apparent that, within the principles and scope of the invention, many changes are possible and contemplated, including in the details, materials, and arrangements of parts which have been described and illustrated to explain the nature of the invention. Thus, while the foregoing description and discussion addresses certain preferred embodiments or elements of the invention, it should further be understood that concepts of the invention, as based upon the foregoing description and discussion, may be readily incorporated into or employed in other embodiments and constructions without departing from the scope of the invention. Accordingly, the following claims are intended to protect the invention broadly as well as in the specific form shown, and all changes, modifications, variations, and other uses and applications which do not depart from the spirit and scope of the invention are deemed to be covered by the invention, which is limited only by the claims which follow.

What is claimed is:

1. A control system for a header of an agricultural harvesting machine including a reel and first and second reel positioning devices controllably operable for moving the reel in first and second directions, respectively, a cutter bar and a cutter bar positioning device controllably operable for moving the cutter bar in the first direction, the control system comprising:

at least one controller in operative control with the first and second reel positioning devices and the cutter bar positioning device, the at least one controller configured, responsive to input commands, for controlling the first and second reel positioning devices and the cutter bar positioning device; and an operator-controlled input connected to the controller operable for inputting commands thereto, the operator-controlled input configured to provide manual control of only one of the first and second reel positioning devices and the cutter bar positioning device at a time in response to an operator selection in a first mode of operation, wherein the operator-controlled input and the controller are configured and co-operable for recognizing a predetermined discrete pattern of the operator-controlled input, and responsive to the predetermined discrete pattern, automatically controlling the first and second reel positioning devices and the cutter bar positioning device to position the reel and the cutter bar to different predetermined relative positions in a second mode of operation.

2. The control system of claim 1, wherein the predetermined discrete pattern of operator inputs comprises at least two successive actuations of the operator-controlled input.

3. The control system of claim 2, wherein the first direction is generally horizontal and the second direction is generally vertical, and the reel moves in a range defined between forward and aft reel positions and upper and lower reel positions, respectively, and the cutter bar moves in a range defined between forward and aft cutter bar positions.

4. The control system of claim 3, wherein the operator-controlled input is a reel up input, and the discrete pattern of operator inputs comprises two successive actuations of the reel up input, and wherein the input and the controller are configured and co-operable for recognizing the two successive actuations of the reel up input and, responsive thereto, for automatically controlling the first and second reel positioning devices and the cutter bar positioning device to position the reel at the forward reel position and between upper and lower reel positions at about two thirds of the range upward, and the cutter bar at the forward cutter bar position.

5. The control system of claim 3, wherein the operator-controlled input is a reel down input, and the discrete pattern of operator inputs comprises two successive actuations of the reel down input, and wherein the input and the controller are configured and co-operable for recognizing the two successive actuations of the reel down input and, responsive thereto, for automatically controlling the first and second reel positioning devices and the cutter bar positioning device to position the reel between forward and aft reel positions at about two thirds of the way aft and between upper and lower reel positions at about one third of the range upward, and the cutter bar at the aft cutter bar position.

6. The control system of claim 3, wherein the operator-controlled input is a reel up input, and the discrete pattern of operator inputs comprises three successive actuations of the reel up input, and wherein the input and the controller are configured and co-operable for recognizing the three successive actuations of the reel up input and, responsive thereto, for automatically controlling the first and second reel positioning devices and the cutter bar positioning device to position the reel at the aft reel position and the lower reel position, and the cutter bar at the aft cutter bar position.

7. The control system of claim 1, wherein the second mode of operation is an operator defined mode, and the different predetermined relative positions are operator defined.

8. The control system of claim 7, wherein the operator defined mode includes positioning the reel and the cutter bar in desired positions, respectively, and defining an associated discrete pattern of the operator-controlled input, and wherein the input and the controller are configured and co-operable for recognizing the defined discrete pattern of the operator-controlled input, and responsive thereto, automatically controlling the first and second reel positioning devices and the cutter bar positioning device to position the reel and the cutter bar in the desired positions, respectively.

9. The control system of claim 7, wherein the operator defined mode includes modifying the predetermined discrete pattern of the operator-controlled input associated with the predetermined positions of the reel and the cutter bar, respectively, and associating the modified discrete pattern of the operator-controlled input with the predetermined positions of the reel and the cutter bar, respectively, and wherein the input and the controller are configured and co-operable for recognizing the modified discrete pattern of the operator-controlled input, and responsive thereto, automatically controlling the first and second reel positioning devices and the cutter bar positioning device to position the reel and the cutter bar in the predetermined positions, respectively.

10. The control system of claim 7, wherein the operator defined mode includes modifying the predetermined positions of the reel and the cutter bar, respectively, and associating the predetermined discrete pattern of operator inputs with the modified positions, respectively, and wherein the input and the controller are configured and co-operable for recognizing the predetermined discrete pattern of the operator-controlled input, and responsive thereto, automatically controlling the first and second reel positioning devices and the cutter bar positioning device to position the reel and the cutter bar in the modified positions, respectively.

11. The control system of claim 1, wherein the operator-controlled input comprises an input from the group of inputs including: reel up input, reel down input, propulsion lever inputs, touch screen inputs, and voice inputs.

12. The control system of claim 1, further comprising first and second reel position sensing devices configured and operable for sensing positions of the reel in the first and second directions, respectively, and a cutter bar position sensing device configured and operable for sensing a position of the cutter bar in the first direction, and for outputting signals representative of the positions of the reel and the cutter bar, respectively, to the controller.

13. A control system for a header of an agricultural harvesting machine including a reel and a fore and aft reel positioning device controllably operable for moving the reel through a range of reel positions bounded by a forward reel position and an aft reel position and a vertical reel positioning device controllably operable for moving the reel through a range of positions bounded by an upper reel position and a lower reel position, a cutter bar and a cutter bar positioning device controllably operable for moving the cutter bar through a range of cutter bar positions bounded by a forward cutter bar position and an aft cutter bar position, the control system comprising:
  at least one controller in operative control with the reel positioning devices and the cutter bar positioning device, the at least one controller configured responsive to input commands for controlling the reel positioning devices and the cutter bar positioning device; and
  an operator-controlled input connected to the controller, operable for inputting commands thereto, the operator-controlled input configured to provide manual control of only one of the reel positioning devices and the cutter bar positioning device in response to an operator selection in a first mode of operation,
  wherein the operator-controlled input and the controller are configured and co-operable for recognizing:
  a first discrete pattern of the operator-controlled inputs, and responsive thereto, automatically controlling the reel positioning devices and the cutter bar positioning device to position the reel to the forward reel position and at a position about two thirds of the range upward from the lower reel position, and the cutter bar to the forward cutter bar position in a second mode of operation;
  a second discrete pattern of the operator-controlled inputs, and responsive thereto, automatically controlling the reel positioning devices and the cutter bar positioning device to position the reel to a position approximately two thirds of the range aft from the forward reel position and at a vertical position at approximately one third of the range upward from the lower reel position, and the cutter bar to the aft position in the second mode of operation; and
  a third discrete pattern of the operator-controlled inputs, and responsive thereto, automatically controlling the fore and aft reel positioning device and the cutter bar positioning device to position the reel to the aft reel position and the lower reel position, and the cutter bar to the aft position in the second mode of operation.

14. The control system of claim 13, wherein the first discrete pattern of operator inputs comprises two successive actuation of a reel up input, the second discrete pattern of operator inputs comprises two successive actuations of a reel down input, and the third discrete pattern of operator inputs comprises three successive actuations of the reel down input.

15. The control system of claim 13, wherein the second mode of operation is an operator defined mode wherein, the operator positions the reel and cutter bar in desired positions and defines an associated discrete pattern of the operator-controlled input, and the operator-controlled input and the controller are configured and co-operable for recognizing the defined discrete pattern of the operator-controlled, and responsive thereto, automatically position the reel and the cutter bar in the desired positions.

* * * * *